United States Patent Office 3,433,133
Patented Mar. 18, 1969

3,433,133
MOTION-TRANSMITTING LINKAGE
Nathaniel Brewer, Doylestown, Pa., and Francis B. Wilson, Hillside, Ill., assignors to GPE Controls, Inc., Morton Grove, Ill., a corporation of Illinois
Filed Sept. 1, 1966, Ser. No. 576,767
U.S. Cl. 92—100        9 Claims
Int. Cl. F01b *19/02;* F16j *3/00;* F16k *31/365*

ABSTRACT OF THE DISCLOSURE

A linkage for transmitting a mechanical motion into a sealed chamber subject to variations in pressure wherein the linkage remains insensitive to such pressure changes although exposed thereto. The linkage is mounted for pivotal movement and the forces to which the linkage is exposed due to said pressure variations are balanced about an axis which intersects the pivotal axis. Novel means are provided for adjusting the two aforementioned axes to bring them into intersection during assembly of the linkage.

---

This invention relates to couplings or linkages for transmitting motion in a predetermined manner between two points which are isolated from one another by means of a fluid-tight seal. More specifically, the invention relates to a motion-transmitting mechanism which is mounted for pivotal movement and subjected to variable pressure within a sealed compartment thereof, and is so constructed and arranged that the pressure variations do not exert a rotational force on the mechanism which would tend to move it about its pivotal axis.

In order to provide a clear understanding of the nature and purpose of the various elements of the invention, the accompanying drawings and following description depict the invention in what is considered to be a typical application thereof. In the illustrated embodiment, the invention is used to transmit the motion of a pressure-sensitive diaphragm to a jet-pipe which directs a pressurized hydraulic fluid toward a system of conduits communicating with a cylinder having a piston movable under the influence of the hydraulic fluid. The pressure variations for moving the diaphragm may be produced by one or more pneumatic sensors connected through suitable air lines to one side of the diaphragm, the other side being at atmospheric pressure. The movement thus produced is transmitted, through the linkage system of the invention, to the jet-pipe which in turn produces a movement of the piston. The piston movement may be utilized in any desired manner as, for instance, to function in the nature of a feedback or closed loop servo system by producing a corrective movement in an element whose position was initially sensed by the pneumatic sensing units connected to the diaphragm.

It is apparent that the diaphragm and jet-pipe must be isolated from one another due to the fact that the hydraulic fluid directed through the jet-pipe is normally under a rather high pressure (e.g., 600 p.s.i.g.) and the diaphragm is at atmospheric pressure on one side and exposed to pneumatic pressure from the sensors on the other side. This may be advantageously accomplished by positioning the jet-pipe and diaphragm in two separate chambers, sealed from one another to prevent pressure variations in the jet-pipe chamber from affecting movement of the diaphragm. Thus, movement of the diaphragm must be transmitted to the jet-pipe through a wall between the chambers while maintaining an effective seal which permits movement to be transmitted in one direction only. That is, movement of the diaphragm must be accurately transmitted to the jet-pipe through the motion-transmitting coupling while the latter is substantially insensitive to variations in pressure within the jet-pipe chamber.

The operation described above is accomplished according to the present invention by providing a pivotal mounting for the motion-transmitting linkage which is movable about its pivotal axis in response to linear movement of a rigid rod connected to the diaphragm. The pivotal movement is transmitted to an output shaft which extends through an opening in the wall of the jet-pipe chamber. The output shaft is enclosed, externally of the jet-pipe chamber, within a flexible sealing member. The interior of the jet-pipe chamber communicates, through the opening provided for the output shaft, with the interior of the sealed space defined by the flexible sealing member. In order that hydraulic pressures within the jet-pipe chamber do not exert a rotational force on the linkage system about its pivotal axis, the elements are so arranged that the central axis of the sealing member perpendicularly intersects the pivotal axis of the linkage system. Means are provided, as will appear more fully in the following detailed description, for quickly and easily assembling the elements of the linkage system to insure the aforesaid relationships between the respective axes of the system. Furthermore, the elements are so constructed and arranged that the necessary movements of the jet-pipe may be accomplished by relatively small angular movements of the linkage about its pivotal mounting, thus providing further advantageous features.

It is a principal object of the invention to provide a novel and improved motion-transmitting linkage for producing, in response to a given input signal, a predetermined movement within a pressurized chamber while effectively sealing the chamber and remaining substantially insensitive to pressure variations therein.

It is a further object to provide a pivotally mounted linkage for transmitting movement from one element to another with improved means for assembling certain portions of the linkage system in a predetermined relationship to one another.

Another object is to provide a mechanical linkage system for transmitting motion into a pressurized chamber through an enclosed, flexible sealing member mounted for rotation about a fixed, pivotal axis wherein the necessary motion is accomplished by a relatively small amount of arcuate movement of the linkage system.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention, reference should be had to the following detailed description taken in connection with the accompanying drawings, in which.

Figure 1:
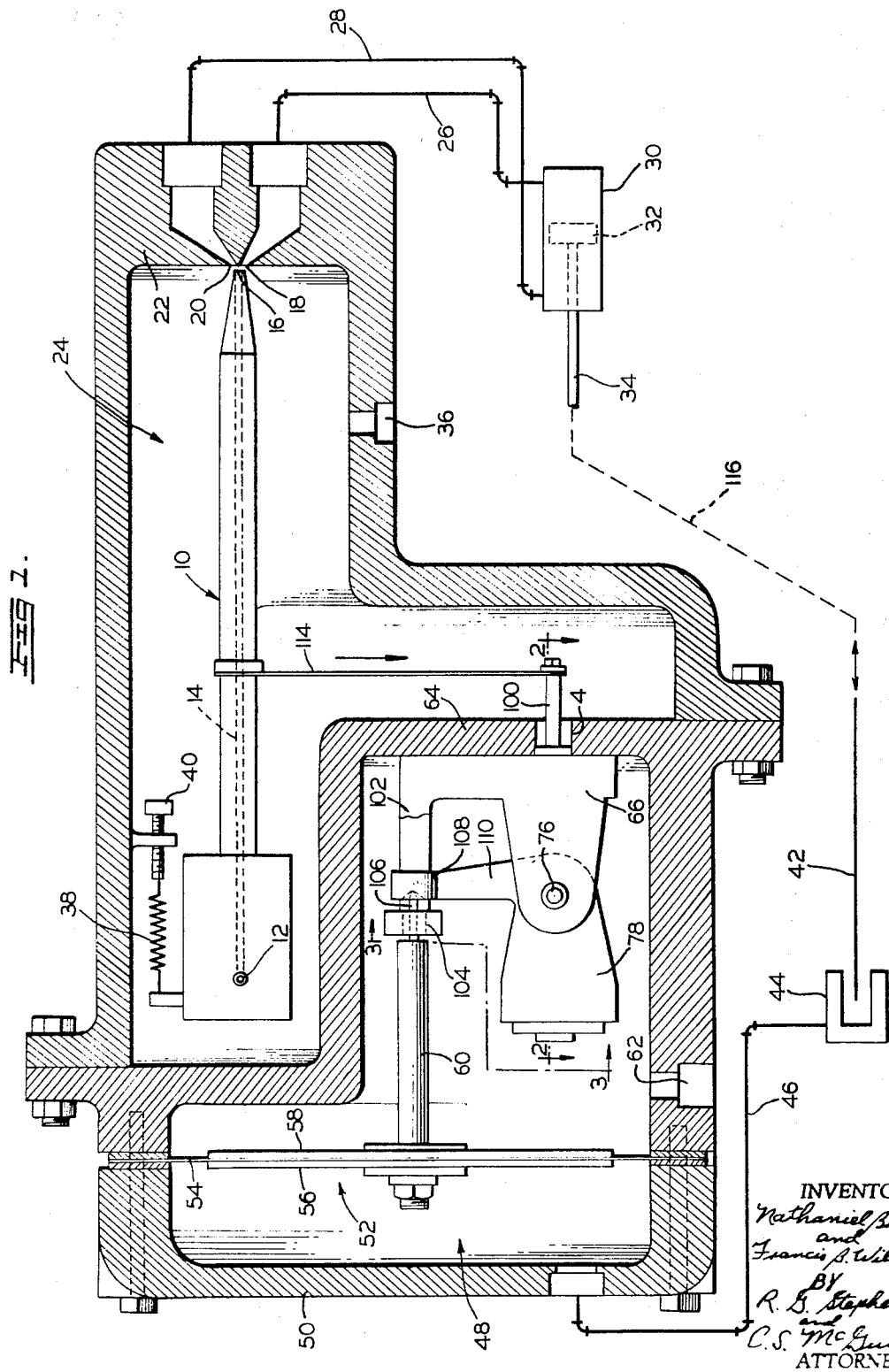
FIG. 1 is a partly diagrammatic showing of a system embodying the present invention with the elements of the control system shown in side elevation, the housing or chambers wherein the elements are contained being in vertical section.

Referring now to the drawings, in FIG. 1 are shown the elements of a hydraulic control system generally known in the art as a jet-pipe control. The jet-pipe control, denoted generally by the reference numeral 10, includes an input orifice 12, connected with a source of pressurized hydraulic fluid, a hollow bore 14 extending axially through the jet-pipe, and nozzle 16. Hydraulic fluid directed into the jet-pipe through input orifice 12 passes through bore 14 and out of nozzle 16 in the tip of the jet-pipe. From nozzle 16 the stream of pressurized fluid is directed toward openings 18 and 20 in end wall 22 of the enclosed housing wherein jet-pipe 10 is supported. The space or chamber defined by this housing is indicated generally by the reference numeral 24. Openings 18 and 20 are connected by means of diagrammatically illustrated lines 26 and 28, respectively, to opposite ends of cylinder 30. The latter has disposed therein, between the connections of lines 26 and 28, reciprocally movable piston 32 having connected thereto rod 34.

Jet-pipe 10, in the illustrated embodiment, is mounted upon means (not shown) for pivotal movement about an axis passing through input orifice 12 and normal to the plane of the paper. Movement of jet-pipe 10 in a clockwise direction as shown in FIG. 1 will result in the hydraulic fluid from nozzle 16 being directed more toward opening 18 than toward opening 20. Therefore, the pressure through line 26 will be increased and that through line 28 decreased, resulting in movement of piston 32 toward the right as seen in FIG. 1. Conversely, movement of jet-pipe 10 in a counterclockwise direction will result in the pressurized fluid being directed more toward opening 20, thereby resulting in movement of piston 32 toward the left as seen in FIG. 1. When jet-pipe 10 is in the central or neutral position so that fluid is directed equally toward openings 20 and 22, the pressures on opposite sides of piston 32 are the same and there is no movement. Thus, movement of piston 32, and more particularly rod 34, may be controlled in a predetermined manner by the accurate positioning of jet-pipe 10.

From the above description it may be seen that during operation of jet-pipe 10, chamber 24 will be at least partially filled with hydraulic fluid under pressure. That is, once lines 26 and 28 and the ends of cylinder 30 are filled with fluid, any additional fluid will remain in chamber 24 after being directed toward openings 18 and/or 20. To provide for continuous operation of the device (i.e., to prevent chamber 24 from becoming completely full) a suitable drain opening such as that indicated by a reference numeral 36 is provided. Jet-pipe 10 is biased toward movement in a counterclockwise direction, as seen in FIG. 1, by means of compression spring 38, having associated therewith conventional adjusting screw 40 for setting the desired degree of biasing force. Movement of the jet-pipe in a clockwise direction, against the biasing force of spring 38, is provided by means which will now be described.

In order that the movement of rod 34, which is functionally related to the position of jet-pipe 10 as previously described, may be controlled in a useful and meaningful manner, the motion of the jet-pipe is functionally related to the position of an element which is coupled in some way to rod 34. For purposes of illustration, the present invention is diagrammatically shown as a means for controlling the lateral position of a web of material, denoted by the reference numeral 42 which is considered to be moving in a direction normal to the plane of the drawing. The position of web 42 is controlled as a function of the position of a lateral edge portion thereof whereby an appropriate edge-sensing unit is provided. In the illustrated embodiment, edge-sensing unit 44 comprises a conventional, pneumatic sensing device which directs a stream of air toward one edge of web 42. The air stream is directed toward an air line, indicated diagrammatically by the reference numeral 46, which is connected at one end to sensing unit 44 and at the other end to enclosed pressure chamber 48. The latter is defined by rigid, cup-shaped wall member 50 having interposed across the open end thereof diaphragm unit 52. This unit is formed in the conventional manner by flexible membrane 54, engaged around its periphery by wall member 50 and another portion of the housing, and engaged in a central portion between rigid plates 56 and 58. The plates serve as a support for rigid push-rod 60 which extends from diaphragm unit 52 on the opposite side thereof from pressure chamber 48.

From the foregoing, it may be seen that movement of diaphragm unit 52 will be controlled as a function of the position of the edge of web 42 passing through sensing unit 44. The air stream across the sensing unit will be intercepted by the edge of the web to a greater or lesser degree in accordance with the lateral position of the web. The degree to which the air stream is intercepted will determine the air pressure in line 46, and thereby in chamber 48. Diaphragm unit 52 is maintained at a constant pressure on the side thereof opposite pressure chamber 48, which may conveniently be accomplished under normal circumstances by venting that side of the diaphragm unit to the atmosphere. In the illustrated embodiment, such venting is provided by opening 62. Thus, movement of diaphragm unit 52, and thereby push-rod 60, in left and right directions as seen in FIG. 1, is a direct function of the pressure in chamber 48 which in turn is controlled by the position of the edge of web 42.

Figure 2:
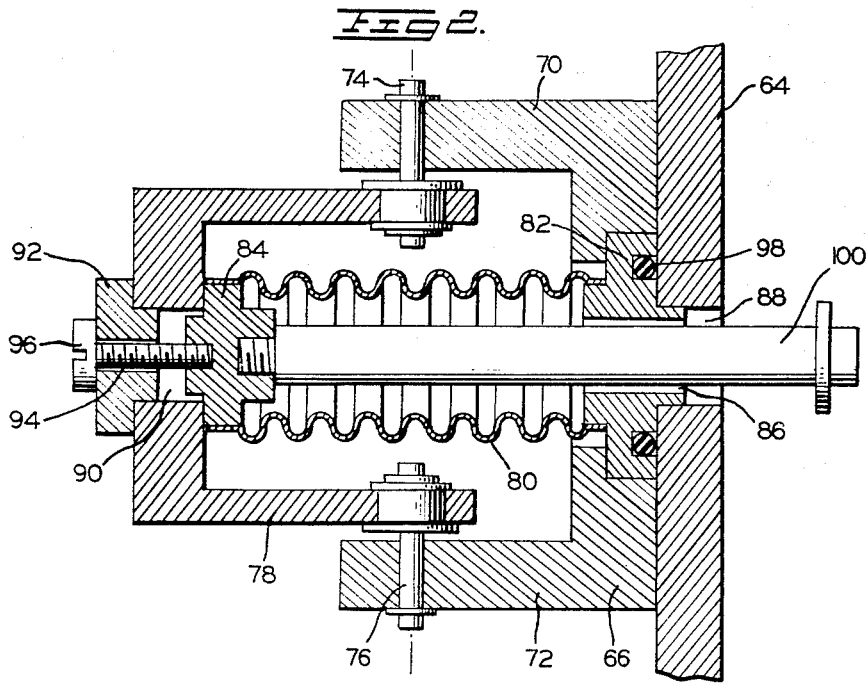
FIG. 2 is a plan view of selected elements of the apparatus of FIG. 1 in section on the line 2—2 of FIG. 1.

Movement of push-rod 60 is transmitted to jet-pipe 10 through wall 64, which separates pressurized chamber 24 from atmospheric pressure, by means of the mechanical linkage of the present invention, which also provides means for effectively sealing chamber 24. Stationary support unit 66 is rigidly attached, e.g., by means of screws or bolts 67 (FIG. 3) to wall 64 on the opposite side thereof from chamber 24. Support unit 66, as seen more clearly in FIG. 2, includes a pair of support arms 70 and 72 extending rearwardly from wall 64. These support arms serve as rigid mounting for a pair of pins 74 and 76, respectively, upon which is pivotally mounted rocker arm 78. An elongated, flexible member 80, which may conveniently be in the form of a conventional cylindrical bellows, includes end portions 82 and 84. End portion 82 is seated in an appropriate recess in support member 66 so as to be urged into engagement with wall 64 when support element 66 is mounted thereon. End portion 82 includes centrally disposed opening 86, which is in registration with opening 88 in wall 64, whereby the interior of bellows 80 communicates with chamber 24.

End portion 84 extends partially into opening 90 in the end of rocker arm 78. Also extending partially into opening 90 from the opposite side is member 92 having opening 94 passing therethrough. Screw 96 passes loosely through opening 94 and is threaded into end portion 84. The shoulders on end portion 84 and member 92 cause these two elements to be tightly engaged with rocker arm 78 as screw 96 is tightened, the head of the screw being larger than opening 94. Thus, bellows 80 is rigidly supported at one end by support unit 66, in close engagement with wall 64, and at the other end upon rocker arm 78. Conventional O-ring 98 is tightly engaged between end portion 82 and wall 64 to insure a fluid-tight seal around opening 88. Output shaft 100 is fixedly secured to end portion 84 and extends axially through bellows 80 and into chamber 24, through openings 86 and 88. The openings are large enough, relative to the diameter of shaft 100, to permit a desired amount of movement of the end of shaft 100 which extends into chamber 24.

Figure 3:
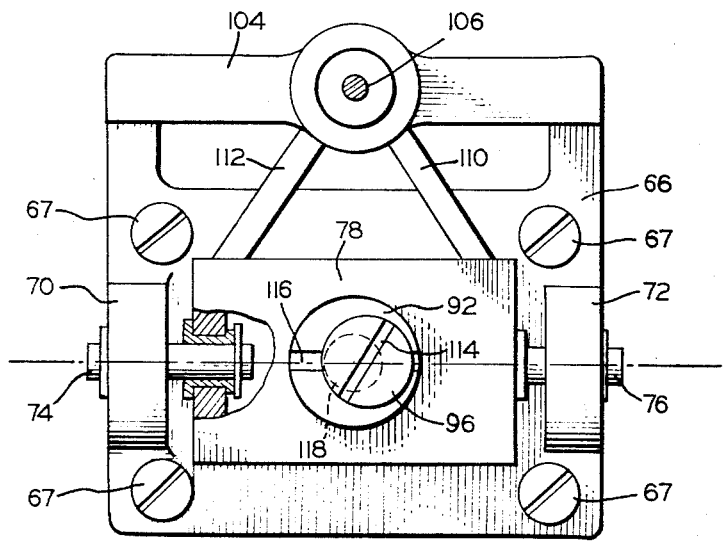
FIG. 3 is an elevational view of the elements shown in FIG. 2 as seen from the line 3—3 of FIG. 1.

Referring again to FIG. 1, support unit 66 includes an upper support portion 102 comprising a pair of arms extending rearwardly from wall 64, and joined together at their ends by a laterally extending member 104 (FIG. 3). A central portion of member 104 is provided with an opening through which extends end portion 106 of push-rod 60. In FIG. 1, one of the arms of upper support portion 102 is broken away to show more clearly how end portion 106 passes through member 104. End portion 106 is shown in section in FIG. 3 extending through member 104. Thus, support unit 66 serves both as a support for the pivotal mounting of rocker arm 78 and as a support and guide for push-rod 60.

The end of end portion 106 of push-rod 60 is designed to bear against portion 108 of rocker arm 78. Portion 108 is rigidly connected by arms 110 and 112 (FIG. 3) to the portion of rocker arm 78 which is pivotally supported on pins 74 and 76. Thus, operation of the device to correct a particular movement of web 42 is as follows: as web 42 moves to the right, the edge thereof will intercept less of the air stream flowing across sensing unit 44; the air pressure in line 46 and chamber 48 will thereby be increased; diaphragm unit 52 and push-rod 60 will be moved toward the right as a result of the pressure increase in chamber 48; rocker arm 78 will be rotated in a clockwise direction, thus moving end portion 84 of bellows 80 in a generally upward direction, and the end of shaft 100 which extends into chamber 24 in a downward direction; shaft 100 is connected to jet-pipe 10 by means of strip 114, whereby nozzle 16 of jet-pipe 10 is directed more toward opening 18 and less toward opening 20; the pressure in line 26 is thus increased, causing movement of piston 32 toward the left; rod 34 is diagrammatically indicated by the dotted line numbered 116 to be connected to means for shifting the lateral position of web 42; movement of rod 34 toward the left will thereby cause movement of web 42 to the left to correct for its initial movement to the right. As web 42 is moved back to its initial position, the air stream across sensing unit 44 will be intercepted to a greater degree, thereby reducing the pressure in chamber 48. Through the above-described sequence of movements, jet-pipe 10 is returned to its central or neutral position to again stabilize piston 32 in a position corresponding to the desired lateral position of web 24.

In order that the above-described system will function properly and will be unaffected by variations in the pressure within chamber 24, the elements of the motion-transmitting system are arranged in a balanced manner. That is, since the interior of bellows 80 communicates with chamber 24, it is important that the hydraulic pressure within this chamber does not exert a turning force on rocker arm 78 about its pivotal mounting. The rocker arm must be responsive only to movement of push-rod 60, and is maintained in engagement therewith by spring 38 tending to rotate jet-pipe 10 in a counterclockwise direction, which exerts an upward force on shaft 100, thereby tending to rotate rocker arm 78 in a counterclockwise direction. The insensitivity of the linkage system to pressures within chamber 24 is provided by arranging bellows 80 with its central, longitudinal axis perpendicular to and intersecting the pivotal axis of rocker arm 78. Thus, all forces on the linkage mechanism produced by the pressure within chamber 24, and thereby within bellows 80, are distributed equally about the central axis of the bellows with a zero resultant torque on rocker arm 78 about its pivotal axis.

An additional feature of the present invention, which insures precise alignment of the longitudinal axis of bellows 80 with the pivotal axis of rocker arm 78, is illustrated in FIG. 3. In this view it may be seen that hole 94 is offset with respect to opening 90 when member 92 is mounted on rocker arm 78. As previously mentioned in connection with FIG. 1, member 92 forms a rather close slip-fit in opening 90 while the end of end portion 84, which extends into opening 90, is a good deal smaller in diameter than the opening.

Both screw 96 and member 92 include lateral slots 115 and 117 respectively. In assembling the device, screw 96 is threaded into the opening provided for this purpose in the end of end portion 84, but is left loose enough that member 92 may be rotated. This may be accomplished by engaging a portion of slot 117 and turning member 92 so that the center of opening 94 therein, and therefore screw 96 and the center of end portion 84, describe a circular path such as that indicated by the dotted line numbered 118 in FIG. 3. As clearly seen in FIG. 3, path 118 intersects the pivotal axis of rocker arm 78 at two points. When the central axis of opening 94, and thereby of end portion 84, lies at one of the points where path 118 intersects the pivotal axis of rocker arm 78, the hydraulic forces exerted on the interior of bellows 80 are essentially balanced so that these forces do not tend to rotate rocker arm 78. Of course, the central axis of bellows 80 is more perpendicular with respect to the pivotal axis at one of the afore-mentioned points of intersection than at the other, but for practical purposes the system is in satisfactory balance at either point of intersection.

The position of member 92, which provides optimum balance, may conveniently be determined by trial and error. That is, with the system fully assembled, the interior of bellows 80 is subjected to a pressure as large or larger than that expected to be encountered in actual use. Member 92 is then rotated until it is apparent that the system is balanced, i.e., no turning force on rocker arm 78 is apparent. At this point, screw 96 may be more fully tightened, thereby forcing member 92 and end portion 84 into tighter engagement with rocker arm 78 on opposite sides of opening 90.

From the foregoing description it may be seen that the present invention provides an efficient and precise means for transmitting a mechanical movement through the wall of a pressurized chamber to an element mounted therein while providing an effective seal of the chamber. The movement is transmitted through a pivotally mounted member which carries a portion of a hollow member communicating with the interior of the pressurized chamber. The elements are so designed that the forces exerted by the pressure within the chamber do not exert a turning moment on the pivotally mounted member. Furthermore, means are provided for easily and quickly adjusting the system to its optimum balance point, thereby allowing wider tolerance in the manufacture of the various parts. In the illustrated system, movements may conveniently be of small magnitude. For example, the conventional jet-pipe controller operates in the intended manner with a total movement at the nozzle of .10″. According to the desired pivot point locations of the system, movement at the diaphragm push-pin may be less than .033″. The volume of air displaced with typical systems such as that illustrated is less than .6 cubic inch per cycle. A high spring rate of spring 38 results in a natural frequency of greater than 10 cycles per second. By limiting movement of end portion 84 to a few degrees of arc, the central axis of bellows 80 remains in substantially perpendicular, intersecting relation to the fixed pivotal axis throughout the entire range of the device, thereby insuring continuous, proper balance of the system.

It will thus be seen that the objects set forth above, among those made apparent from the preceding description, are efficiently attained, and since certain changes may be made in the above construction without departing from the scope of the invention, it is intended that all matter contained or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. In a system having a chamber holding a fluid under variable pressure, apparatus for transmitting a mechanical movement into said chamber while sealing the latter and remaining substantially insensitive to pressure variations therein, said apparatus comprising, in combination:

(a) an elongated, fluid-tight member disposed outside said chamber and having first and second spaced end portions connected by a hollow, flexible wall member defining an enclosed space;

(b) aperture means through which said enclosed space communicates with said chamber, thereby subjecting the interior of said first end portion to said pressure variations;

(c) pivotally supported mounting means for said elongated member supporting said first end portion for movement about the fixed rotational axis of said mounting means;

(d) a rigid output shaft fixedly secured to said first end portion for movement therewith, and extending through said enclosed space and said aperture means to terminate within said chamber; and (e) adjusting means for selectively positioning said first end portion relative to said mounting means and thereby to said rotational axis in such a way that the interior area of said first end portion may be positioned symmetrically with respect to a line passing through said aperture means and perpendicularly intersecting said rotational axis, thereby balancing, with respect to said rotational axis, the forces exerted on said interior area due to said pressure variations.

2. The invention according to claim 1 wherein said adjusting means comprises an adjusting member secured to said first end and engaged by said mounting means, said adjusting member being movable to carry the central axis of said first end in a path which intersects said rotational axis.

3. The invention according to claim 2 wherein said adjusting member is substantially cylindrical and is rotatable in a cylindrical opening in said mounting means wherein it is engaged, said adjusting member and one end being secured along an axis passing substantially through the center of said one end and offset with respect to the center of said cylindrical opening.

4. The invention according to claim 1 wherein said rotational movement of said first end is limited to not more than a few degrees of arc.

5. The invention according to claim 4 wherein said second end of said elongated member is fixedly secured to the exterior of a wall of said chamber, and said aperture means extends through both said second end and said wall.

6. The invention according to claim 1 wherein said mounting means comprises a rocker arm to which said first end portion is secured and mounted for movement about said rotational axis in response to movement of signal responsive means supported for movement externally of said chamber.

7. The invention according to claim 6 wherein said signal responsive means provides an essentially linear movement along a line substantially parallel to the longitudinal axis of said elongated member and displaced from intersection with said rotational axis.

8. The invention according to claim 7 wherein said signal responsive means comprises a pressure sensitive diaphragm with a push pin adapted to move said rocker arm about said pivotal axis.

9. The invention according to claim 8 wherein said elongated, fluid-tight member comprises a cylindrical bellows.

References Cited

UNITED STATES PATENTS

| | | | |
|---|---|---|---|
| 2,417,546 | 3/1947 | DeGiers | 137—335.2 X |
| 3,019,805 | 2/1962 | Gordon | 137—83 |
| 3,273,854 | 9/1966 | Bryant | 251—229 X |
| 3,362,296 | 1/1968 | Gray | 91—3 |

FOREIGN PATENTS 1,114,452  10/1961  Germany.

ALAN COHEN, *Primary Examiner.*

U.S. Cl. X.R.

92—140; 91—3; 74—18.1; 137—83; 251—335; 136—162